Oct. 30, 1951     J. E. TAYLOR     2,573,626
ELECTRICAL COMPUTER
Filed June 13, 1946     2 SHEETS—SHEET 1
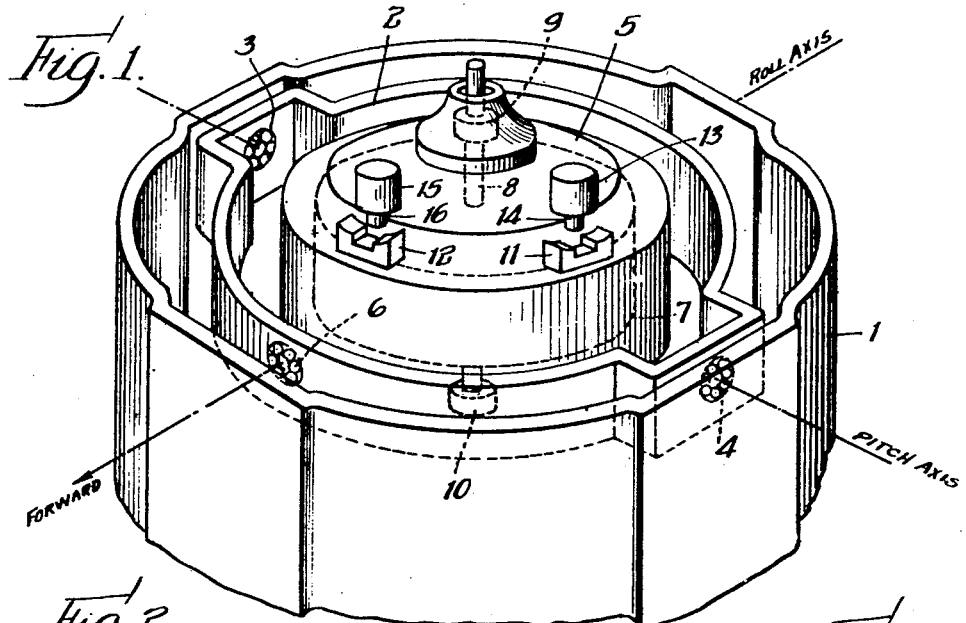
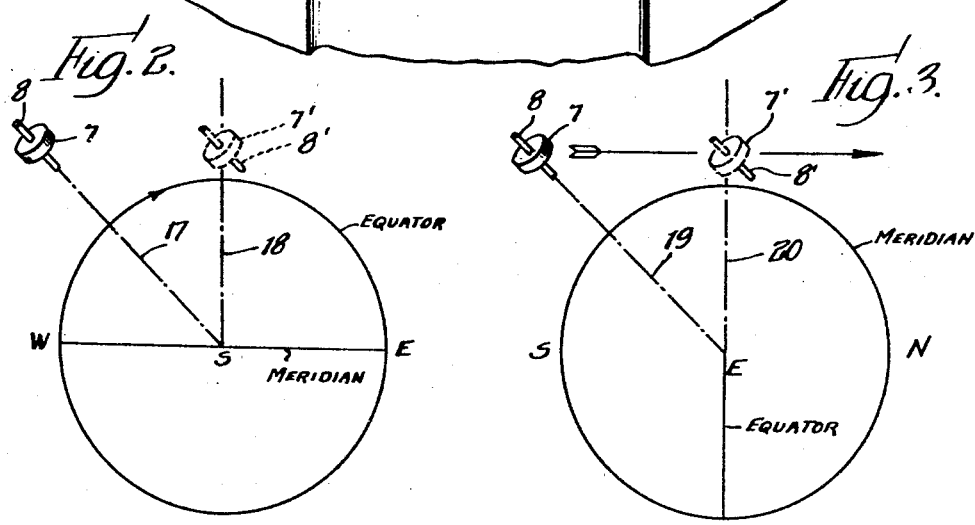
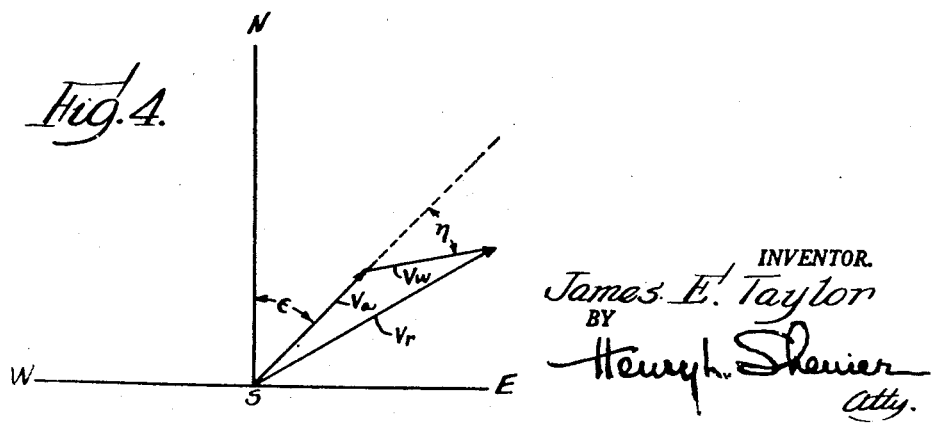
INVENTOR.
James E. Taylor
BY
Henry L. Shenier
Atty.

Oct. 30, 1951        J. E. TAYLOR        2,573,626
ELECTRICAL COMPUTER

Filed June 13, 1946        2 SHEETS—SHEET 2

Fig. 5.

INVENTOR.
James E. Taylor
BY
Henry L. Silverer
Atty.

Patented Oct. 30, 1951

2,573,626

UNITED STATES PATENT OFFICE 2,573,626

ELECTRICAL COMPUTER

James E. Taylor, New York, N. Y., assignor to The Norden Laboratories Corporation, New York, N. Y., a corporation of Connecticut Application June 13, 1946, Serial No. 676,411

9 Claims. (Cl. 175—335)

My invention relates to electrical computers, and more particularly to a device which will generate the signals which are functions of the torques required to precess a gyroscope mounted with its spin axis in a vertical direction around the pitch and roll axes in order to maintain the spin axis of the gyroscope in alignment with a line passing through the center of the earth, irrespective of the rotation of the earth and irrespective of the course and speed of a vehicle on which the gyroscope is mounted.

A gyroscope having three degrees of freedom will tend to maintain its position in space irrespective of the rotation of the earth or of its movement relative to the surface of the earth. If a gyroscope were mounted with three degrees of freedom and arranged so that its spin axis is in alignment with gravity, that is, in alignment with a line drawn through the center of the earth, there will be introduced an error at the rate of a quarter of a degree per minute, or fifteen minutes of arc per minute of time due to the rotation of the earth, if the gyroscope is located at the equator. On a vertical gyroscope at a pole, the rotation of the earth has no effect. The variation due to the rotation of the earth changes as the cosine of the latitude of the place at which the gyroscope is located. If the gyroscope were mounted in a vehicle, say an airplane, and the airplane were headed in an easterly direction, the precession of the gyroscope would be about the pitch axis in order to compensate for the rotation of the earth. To accomplish this, the torque producing precession would have to be applied at right angles to the pitch axis or about the roll axis. If the airplane were headed northwardly, the precession to compensate for the rotation of the earth would have to be about the roll axis, and the torque to produce the precession would have to be applied around the pitch axis.

Movement of the plane in an easterly or westerly direction varies the correction precessional rate. A plane moving from west to east increases the precession producing torque which must be applied. A plane traveling from east to west decreases the precession producing torque to be applied.

A plane headed in a northerly or southerly direction introduces a variation in the alignment of the gyroscope axis, requiring the precession of the gyroscope around the pitch axis in order to compensate for the error introduced. The torque which produces precession around the pitch axis must be applied at right angles thereto or around the roll axis.

For travel of the plane along courses intermediate the cardinal points, a proper component of precession producing torque must be applied about both the roll and pitch axes in order to maintain the spin axis of the gyroscope in a true vertical direction.

One object of my invention is to provide an electric computer for producing a signal which is a function of the torque required to precess a gyroscope to compensate for the rotational motion of the gyroscope housing in space.

Another object of my invention is to provide an electric computer capable of producing a signal which is a function of the torque required to precess a gyroscope to compensate for the rotational motion in space of its housing produced by the rotation of the earth about its axis.

Another object of my invention is to provide an electric computer capable of producing a signal which is a function of the torque required to precess a gyroscope to compensate for the rotational motion in space of its housing produced by the motion of the vehicle upon which the gyroscope housing is mounted about the earth.

Other and further objects of my invention will appear from the following description.

In the accompanying drawings, which form part of the instant specification and which are to be read in conjunction therewith, and in which like reference numerals are used to indicate like parts in the various views:

Fig. 1 is a perspective view of a gyroscope mounted with three degrees of freedom showing the position of the compensatory permanent magnets and electromagnets to produce precessions about the pitch and roll axes.

Fig. 2 is a projection of the earth on the plane of the equator showing the error introduced in a vertical gyroscope by the rotation of the earth.

Fig. 3 is a projection of the earth upon the plane of a meridian showing the error introduced in the vertical alignment of a vertical gyroscope by travel in a northerly direction Fig. 4 is a vector diagram showing vectors representing the speed and heading of an airplane, the speed and direction of the wind, and the resultant course and speed of an airplane over the earth's surface at a latitude L.

Fig. 5 is a schematic view showing the electrical circuits of a computer containing one embodiment of my invention.

Referring now to the drawings, a gyroscope housing 1 is mounted upon an airplane or any other vehicle capable of moving about the surface of the earth. The housing is oriented in the direction shown by the arrow. Mounted for rotation at right angles to the fore and aft axis of the craft upon which the housing is mounted, I provide a Cardan 2 adapted to rotate around the athwartship or pitch axis about bearings 3 and 4. For rotation about a line parallel to the fore and aft or roll axis, I mount a gyroscope housing 5, carried by the Cardan 2 in a pair of bearings 6. A gyroscope wheel 7 is carried by a shaft 8 for rotation in bearings 9 and 10 carried by the gyroscope housing 5. Secured to the gyroscope housing symmetrically about the pitch axis, I provide a permanent magnet 11 with its north and south poles directed upwardly. A second permanent magnet 12 is mounted on the gyro-housing 5 symmetrically about the roll axis. Mounted on any suitable support (not shown) carried by the housing 1, I provide an electromagnet 13 with its axis 14 positioned adjacent the north and south poles of the permanent magnet 11. A second electromagnet 15 is mounted on a suitable support (not shown) carried either by the Cardan 2 or the housing 1, with its core positioned adjacent the north and south poles of the permanent magnet 12. It will be seen that the current flowing in the winding of the electromagnet 13 will produce a magnetic flux in its core 14 to cause the housing 5 to exercise torque about the athwartship or pitch axis. This will cause precession about the roll axis. Likewise, the current flowing in the windings of the electromagnet 15 will produce magnetic flux in the core 16 which will cause a torque around the roll axis by reaction with the permanent magnet 12, thus causing the gyroscope 7 to precess about the athwartship or pitch axis.

Referring now to Fig. 2, the gyroscope wheel 7 is shown with its spin axis 8 aligned with the line 17 representing the true vertical direction. The earth rotates from west to east, as shown by the arrow on the equator. In three hours the earth will have moved from the position shown by the construction line 17 to the position shown by the construction line 18. The gyroscope 7 will have been carried around by the earth to the dotted line position shown at 7'. It will be observed that its spin axis 8' in the new position is parallel to the original direction. In order to keep the spin axis 8 aligned with true gravity, it is necessary to precess the gyroscope so the top of the gyroscope axis will move in an easterly direction. When the airplane is headed northwardly, the precession must be about the fore and aft axis. When the airplane is headed eastwardly, the precession must be about the pitch axis. At intercardinal headings, the precession to compensate for the rotation of the earth must be about both axes, the precession around the pitch axis varying as the cosine of the co-heading of the vehicle, and the precession around the roll axis varying as the sine of the co-heading of the vehicle. The cosine of the co-heading is equal to the sine of the heading, and the sine of the co-heading is equal to the cosine of the heading. Accordingly, for the rotation of the earth, the precessional correction around the pitch axis is proportional to the sine of the heading, and the precessional correction around the roll axis is proportional to the cosine of the heading.

Referring now to Fig. 3, the gyroscope 7 is assumed to be mounted on an airplane traveling due north, as indicated by the arrow. Its spin axis 8 is in alignment with the line 19, which indicates the true vertical. After the airplane has traveled northwardly from latitude 45 degrees south, to the equator, the gyroscope will be in the dotted line position 7'. It will be observed that its axis 8' is still parallel to its original direction 19 and not in alignment with the line 20 which now indicates the true vertical. In order to correct for the deviation produced by the motion of the plane in a northerly direction, it will be necessary to precess the gyroscope so that the top of its axis 8 will move northwardly. The precession for an airplane heading northwardly would be about the athwartship or pitch axis. The rate of precession would depend upon the speed of the plane neglecting wind. Since the pitch axis is always at right angles to the heading of the plane, the speed of the plane will introduce an error only around the pitch axis. Thus far we have neglected to consider the effect of the wind. Referring now to Fig. 4, let us assume that the airplane having the gyroscope mounted as shown in Fig. 1 is traveling on a heading $\epsilon$ at a velocity indicated by the vector $V_a$. Let us assume that the wind is blowing in a direction making an angle $\eta$ with the heading of the plane at a velocity indicated by the vector $V_w$. The resultant course of the plane is indicated by the vector $V_r$.

Now let $W_p$ equal the angular rate of correction precession about the pitch axis, and let $W_r$ be the angular rate of correction precession about the roll axis. Let $W_E$ be the angular rotation rate of the earth, and let the air-craft be located at a latitude L. The following relations now apply:

(I) $$W_p = W_E \cos L \sin \epsilon + \frac{V_a}{R} + \frac{V_w}{R} \cos \eta$$

(II) $$W_r = W_E \cos L \cos \epsilon + \frac{V_w}{R} \sin \eta$$

where R is a constant.

It will be readily apparent that to obtain the desired corrections it is necessary that my computer must provide an output signal which is a function of $W_p$ to be applied as a torque around the roll axis, and an output signal which is a function of $W_r$ to be applied as a torque about the pitch axis. The torques must be applied furthermore in a proper direction, depending on the direction of spin of the gyroscope wheel, to precess the gyroscope so that its vertical axis will always be maintained in alignment with the direction of true gravity.

Referring now to Fig. 5, a source of alternating potential 21, which may be for example at a frequency of 400 cycles per second, is connected across the rotor 22 of a synchronous type sine-cosine generator 23 having stator windings 24 and 25, by means of conductors 26 and 27. The position of rotor 22 may be changed by a knob 28 of the heading dial 29. The arrangement is such that there is produced across winding 24 an alternating current which is a function of the cosine of the heading, and across the winding 25 an alternating current which is a function of the sine of the heading. The conductor 26 is connected to a conductor 30 by a variable resistance 31. One side of the rotor 32 of a second synchronous type sine-cosine generator 33 is connected to one side of the alternating current source 21 through conductor 26, resistance 31, and conductor 30. The other side of the rotor winding 32 is connected by conductor 34 and conductor 35 to the conductor 27 which is connected to the ground 36. The circuit is thus completed through the rotor 32. The rotor 32 is controlled by the control knob 37 of the wind direction dial 38. It is mounted at right angles to the pointer 39 of the dial 38 such that there is produced across stator winding 40 of the generator 33 a signal which is a function of the sine of $\eta$, which is the angle between the heading and the wind direction. The construction is such, furthermore, that there is produced across the stator winding 41 of the generator 33 an alternating potential whose amplitude is a function of the cosine of $\eta$. The alternating potential source 21 is connected across the primary winding 42 of a transformer 43, one side of the primary being connected to the conductor 26 through variable resistance 44 and conductor 45. The other side of the primary winding 42 is connected to ground by means of conductors 46, 35 and 27. There is thus produced across the secondary winding 47 of the transformer 43 an alternating current potential. The output of the secondary winding 47 is connected across a voltage dividing resistor 50. One side of the voltage dividing resistor 50 is connected by conductor 51 to one side of the primary winding 48 of a transformer 49. The other side of the primary winding 48 is connected by conductor 52 to a voltage dividing resistor 53, which is connected across the stator winding 25 by means of conductors 54 and 55. The output of stator winding 24 is connected across a voltage dividing resistor 56 by means of conductors 57 and 58. The output of stator winding 41 is connected across a voltage dividing resistor 59 by means of conductors 60 and 61. The output of stator winding 40 is connected across a voltage dividing resistor 62 by means of conductors 63 and 64. One side of the voltage divider 53 is connected in series with one side of voltage divider 59 by means of conductors 65 and 60. The variable arm 66 of the voltage divider 59 is connected to the variable arm 67 of voltage divider 50 by means of conductor 68. The effect of the voltage divider 50 is governed by the control knob 69 of the air speed dial 70. The arrangement is such that when the air speed pointer 71 is moved to the zero position, the movable arm 67 of the voltage divider 50 by-passes the potential across the voltage divider 50. Associated with the voltage divider 62 is a movable arm 72. Both arms 66 and 72 of voltage dividers 59 and 62 are controlled by the control knob 73 of the wind speed dial 74. The construction is such that when the wind speed pointer 75 is at zero position, the voltage dividers 59 and 62 are by-passed and are without effect upon the signals produced. Associated with the voltage divider 56 is a movable arm 76 connected by conductor 77 to one side of a primary winding 78 of a transformer 79. The movable connection 52 of the voltage divider 53 and the movable connection 76 of the voltage divider 56 are moved as a function of the cosine of latitude by the control knob 80. The control knob 80 rotates a shaft 81, to which is secured a disk 32 carrying a pin 83. The pin 83 is lodged in a cam slot 84 formed in a rack 85 which engages a pinion 86 secured to a shaft 87 which governs the movement of the variable arms 52 and 76. Movement of the rack 85 to the right will move the arms 76 and 52 to the left, giving maximum effect to the voltages across voltage dividers 53 and 56. Movement of the rack 85 to the left moves the variable arms 52 and 76 to the right, giving smaller effect to the voltages across voltage dividers 53 and 56. Movement of the pointer 88 of the latitude dial 89 to the 90 degree position effectively by-passes the voltage dividers 53 and 56.

A twin triode 90 is provided with a pair of plates 91 and 92 and common cathode 93, which is heated by a filament 94. The cathode 93 is connected to ground 36 through resistor 95 and conductor 96. Current is supplied from the filament heating battery 97 through conductor 98, the current returning through ground connection 96. Anode potential, which may be at 300 volts, is supplied from plate battery 99, through conductor 100, through conductor 101, balancing resistor 102, through windings 15 and 15', through conductors 103 and 104 to the anodes 92 and 91 of the thermionic tube 90. The windings 15 and 15', it will be observed, are parallel wound and differentially connected and form the winding of electromagnet 15, shown in Fig. 1. They carry the current which is developed by the computer, which is a function of the correction precessional rate, around the pitch axis.

This precessional correction is applied as a torque around the roll axis, as can readily be seen by reference to Fig. 1. The core 16 around which the windings 15 and 15' are wound is made of non-magnetic material.

The opposite ends of the secondary winding 105 of the transformer 49 are connected by conductors 106 and 107 to the grids 108 and 109 of the thermionic tube 90. It will be observed that the secondary winding 105 is connected across the grids in a push-pull relation such that when grid 109 is of positive potential, grid 108 will be correspondingly of negative potential. A bias battery 110 having a potential say of 150 volts has its negative terminal connected by resistor 111, resistor 112, conductor 113, and conductor 114 to the midpoint of the secondary winding 105, such that the grids 108 and 109 are biased beyond the anode current cut-off with neither push-push nor push-pull voltages (class C) so that, with the push-push potential applied, the anode currents will be small in absence of a push-pull potential. When the signal voltage is applied in push-pull to either tube, one anode current will increase. This increase or decrease of the plate current is produced respectively by the addition or subtraction in amplitude of the push-push and push-pull voltages in the grid circuits.

A second thermionic tube 115 is provided with a pair of plates 116 and 117, and a common cathode 118. The cathode is connected to ground through resistor 119 and conductor 96. The filament heater 120 is provided with current from the filament heater battery 97 through conductors 98 and 96. Potential from the plate battery 99 is supplied through conductor 100, balancing resistor 121, windings 13 and 13', and conductors 122 and 123, to the anodes 116 and 117 of the thermionic tube 115. It will be noted that the windings 13 and 13' are parallel wound and are connected with opposite polarity with respect to windings 15 and 15'. The current flowing through windings 13 and 13' governs the precession about the roll axis. This is effective as a torque which must be aplied about the pitch axis to produce precession around the roll axis.

Windings 13 and 13' are by-passed by capacitors 124 and 125 to provide a low impedance path for alternating current components. In a similar manner windings 15 and 15' are by-passed by capacitors 126 and 127.

The terminals of the secondary winding 128 of transformer 79 are connected respectively by conductors 129 and 130 to the grids 131 and 132 of the thermionic tube 115. It will be observed that the secondary winding 128 is connected in push-pull arrangement such that as grid 132 goes positive, grid 131 will go correspondingly negative. The grids are biased with the negative potential of battery 110 through conductor 114 in a manner similar to the biasing of grids 108 and 109 of thermionic tube 90.

The alternating potential of source 21 is led by conductor 133 to a phase shifting network indicated generally by the reference numeral 134. The return circuit from the phase shifting network is through conductor 135, choke coil 136, and conductor 137, to ground. A capacitor 138 connects the network 134 to conductor 114 which it will be observed is connected to the midpoint of the transformer secondaries 105 and 128. The alternating potential which exists between conductor 114 and ground is impressed upon both grids 108 and 109 of thermionic tube 90 in push-push relation. Similarly, the alternating potential between conductor 114 and ground is thus impressed upon the grids 131 and 132 of thermionic tube 115 in push-push relation. The variable resistance 139 of the phase shifting network is so adjusted as to bring the push-push signal in proper phase relation with the signals existing in secondary windings 105 and 128. When no signal exists in the primary windings 48 and 78, a series of equal pulses will flow through the windings 15 and 15' and 13 and 13'. Balancing resistor 102 is set such that the plate current flowing through the winding 15 is the same as the plate current flowing through the winding 15'. Similarly, the balancing resistor 121 is set such that the curent flowing through the winding 13 is the same as the current flowing through the winding 13'. Since the windings are parallel wound and differentially connected, the net effect of the current flow insofar as the generation of magnetic flux is concerned, will be zero. The signal which is generated in primary winding 43 is applied to the grids 108 and 109 of thermionic tube 90 in push-pull relation by the secondary winding 105. This signal, depending upon its amplitude and phase, will increase or decrease the current flowing in winding 15 with respect to winding 15' or vice versa. Similarly, the signal generated in primary winding 78 is applied to the grids 131 and 132 of thermionic tube 115 in push-pull relation. This signal, therefore, will increase or decrease the current flowing in winding 13 with respect to winding 13' or vice versa, proportional to its amplitude and phase. The result of both signals will be to produce pulsating direct currents which are proportional to the signals produced by the roll and pitch channels as appearing in secondary windings 128 and 105 respectively. The by-pass condensers 124, 125, 126, and 127 smooth these currents, with a resultant smaller amplitude change. The application of the output signal of the phase shifting network 134 to the grids of the tubes 90 and 115 is the application of a phase detecting signal.

Let us now refer to Equation I above, which defines the angular rate of correction precession about a horizontal axis perpendicular to the roll axis of the aircraft, that is, around the transverse or pitch axis. Let us assume that the airplane is headed east and is stationary at a point on the earth's equator. The wind will, therefore, be zero, the air speed will be zero, the wind direction will be zero, and the latitude is zero. The Equation I would then become—

$$W_p \text{ equals } W_E$$

In other words, the only correction around the pitch axis is that for the angular rotation of the earth. At a heading of 90 degrees, the rotor 22 is in such position as to generate in stator winding 25 the maximum potential. The setting of the latitude pointer 88 to zero moves arm 52 to the left, giving maximum effect to the voltage across divider 53. The setting of the air speed to zero by-passes the voltage divider 50 and the setting of the wind speed to zero by-passes the voltage divider 59. The maximum output, therefore, generated in stator winding 25 as it appears across resistor 53 will flow through conductor 52, through primary winding 48, through conductor 51, through conductor 67, through conductor 68, through arm 66, through conductor 60, and conductor 65. The value of resistor 53 is such that in connection with the parameter of the entire circuit that there is produced in winding 15 a sufficient current to generate the magnetic flux flowing in the proper direction with respect to the polarity of the poles of permanent magnet 12 to precess the top of gyroscope axis 8 eastwardly at the rate of one quarter degree per minute, which is equivalent to the angular rate of rotation of the earth about its axis.

It will be further observed that with the conditions just recited, the cosine of 90 degrees is zero so that no precession about the roll axis takes place.

Let us now assume that the heading of the airplane be altered so that it is headed north, that is, the heading is zero degrees, the other conditions being the same. Under this assumption the precession about the pitch axis now becomes zero, while Equation II becomes—

$$W_r \text{ equals } W_E$$

In the previous example, no voltage is generated across the stator winding 24. In the case now assumed, no voltage will be generated across stator winding 25, and the maximum voltage will be generated across the winding 24 of the stator of the synchronous generator 23. This voltage is impressed across the resistor 56 and current will flow through variable arm 76, conductor 77, primary winding 78, conductor 140, movable arm 72, conductor 63, conductor 141, conductor 58, to the other side of the resistor 56. The signal in the primary winding 78 will be reflected in the secondary winding 128 and impressed upon the grids 131 and 132 of the tube 115. Maximum current will flow through one of the windings 13 or 13' in such relation as to produce a torque around the pitch axis through interaction with permanent magnet 11 to precess the top of the gyroscope axis 8 to starboard, that is, toward the east, at a rate of a quarter of a degree per hour.

The circuit values are such that the potential across resistor 50 will provide a precession correction of $\frac{1}{36}$ degree per minute for every one hundred knots (nautical miles per hour) speed. It will be observed that the output of the voltage divider 53 is connected in series with the voltage divider 50. It will be further observed that the voltage divider 59 is likewise in series with both voltage dividers 53 and 50. The potential impressed across the voltage divider 53 by conductors 54 and 55 is a function of sine $\epsilon$. The voltage taken from voltage divider 53 is a function of cosine L. The output of the voltage divider 53, therefore, is proportional to—

$$W_E \cos L \sin \epsilon$$

The potential impressed across voltage divider 59 by conductors 60 and 61 is proportional to cosine $\eta$. The position of movable arm 66 is proportional to the velocity of the wind. The voltage produced across voltage divider 59, therefore, is equal to the expression—

$$\frac{V_w}{R} \cos \eta$$

It has been pointed out that the voltage produced by voltage divider 50 is proportional to the velocity of the aircraft. Since the three voltage dividers are connected in series across the primary 48 of transformer 49, the signal produced in the primary winding 48 will be proportional to $W_p$, which is the desired angular rate of correction precession about the pitch axis.

The voltage generated across winding 49 and appearing across conductors 63 and 64 is proportional to sine $\eta$. The voltage impressed across voltage divider 56 by conductors 57 and 58 is proportional to cosine $\epsilon$. The movement of arm 76 is proportional to cosine L. The voltage produced by resistor 56, therefore, represents the expression—

$$W_E \cos L \cos \epsilon$$

The voltage divider 56 is in series with the voltage divider 62 across the primary winding 78 of the transformer 79, and the signal produced in winding 78 will be proportional to Equation II above. This signal is applied to the grids 131 and 132 of thermionic tube 115 by the secondary winding 128 in push-pull relation and produces a magnetic flux in the electromagnet 13 proportional to $W_r$, that is, the angular rate of correction precession about the fore and aft axis. This is applied as a torque about the pitch axis producing the desired angular rate of correction precession.

In the foregoing equations it has been assumed that the earth is a perfect sphere. Actually it is an oblate spheroid with the distance between the poles being 7900 miles and the distance across the equator being 7927 miles. A negligible error is introduced by this assumption. If, however, it be desired to correct for this error, it can be easily accomplished by inclining the cam slot 84 of the rack 85 from the zero latitude position in each direction so as to minimize slightly the effect of the latitude. In other words, in each case the cosine of latitude produces a value slightly greater than the actual trigonometric value.

It will be seen that I have accomplished the objects of my invention. The voltages applied to the grids of each thermionic tube will be such that their differences are proportional to $W_p$ and $W_r$ in Equations I and II above. The thermionic tubes are so adjusted that the difference in the plate currents of the two anodes of each tube are also proportional to these desired functions. The magnetic fields produced by the coil difference currents react with those due to the permanent magnets to produce torques. The magnitudes of the torques and the resulting precession rates are proportional to the difference currents and therefore to the desired functions of heading latitude, air speed, wind speed, and wind direction.

The magnetic fields produced by the permanent magnets 11 and 12 are sufficiently high that the electromagnets will produce fields having sufficient linearity to produce the desired results. The magnetic field of the permanent magnets are much stronger than the magnetic fields produced by the difference currents in the windings of the electromagnets 13 and 15. I provided an electric computer for producing a signal which is a function of the torque required to precess a gyroscope to compensate for rotational motion of the gyroscope housing in space, which motion is produced both by the motion of the plane with respect to the surface of the earth, and the rotation of the earth about its axis. The precessional correction is applied irrespective of accelerations of the airplane upon which the gyroscope is mounted.

It is to be understood that while I have shown synchronous sine-cosine generators 23 and 33 for producing signals which are trigonometric functions of $\epsilon$ and trigonometric functions of $\eta$, any other suitable means for producing signals varying as trigonometric functions of these hypotheses may be employed. For example, a cosine drive such as shown in connection with the latitude dial may be employed to drive a variable arm across a resistor, thus producing output signals which are trigonometric functions of the input signal. Similarly, instead of the cosine drive shown in connection with the latitude dial and voltage dividing resistors 53 and 56, synchronous sine-cosine generators may be employed instead of the voltage dividers and the cosine drive. To obtain multiplication of functions, the output signal representing one function is connected in cascade relation to the input means producing the other function. To obtain addition of functions, their output signals are connected in series. What has been said with reference to voltage dividing resistors 53 and 56 is equally applicable to voltage dividing resistors 50, 59, and 62. These may be replaced by synchronous generators adapted to produce signals proportional to the air speed and wind speed respectively.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described my invention, I claim:

1. A computer including in combination, means for generating an alternating potential signal which is a function of the angular rate of correction precession of a gyroscope, a transformer, means for impressing said signal across the primary of said transformer, a pair of thermionic tubes each having a grid and an anode, means for connecting the secondary of said transformer to said grids in push-pull relation, a source of alternating potential of the same frequency as said signal, a channel for impressing said potential upon said grids in push-push relation in series with said push-pull signal, an electromagnet having a pair of parallel wound and differentially connected windings, and means for connecting respective windings in series with the respective anodes of said tubes.

2. A computer as in claim 1 in which the channel between said alternating potential source and said grids includes a phase shifting network.

3. A computer including in combination, means for generating an alternating potential signal which is a function of the angular rate of precession about a horizontal axis perpendicular to the fore and aft axis of a gyroscope mounted with three degrees of freedom and having a vertical spin axis, means for generating a second alternating potential signal which is a function of the angular rate of correction precession about an axis parallel to said fore and aft axis, a first pair of thermionic tubes each having a grid and an anode, a first transformer, means for impressing said first signal across said first transformer, means connecting the secondary of said transformer to said grids in push-pull relation, a first electromagnet having a pair of parallel wound and differentially connected windings, means for connecting said electromagnet with respective windings disposed in series with the respective anodes of said first pair of anodes, a second transformer, means for impressing said second signal across the primary of said second transformer, a second pair of thermionic tubes each having a grid and an anode, means for connecting the secondary of said second transformer to said second grids in push-pull relation, a second electromagnet having a second pair of parallel wound and differentially connected windings, means for connecting said second pair of windings in series with respective anodes of said second pair of anodes, a source of alternating potential of the same frequency as said signals, and a channel for impressing said alternating potential on both pairs of grids in push-push relation in series with said push-pull signals.

4. A computer as in claim 3 in which the channel between said alternating potential source and said grids includes a phase shifting network.

5. A computer including in combination, means for generating an alternating potential signal which is a function of the angular rate of correction precession of a gyroscope, a transformer, means for impressing said signal across the primary of said transformer, a pair of thermionic tubes each having a grid and an anode, means for connecting the secondary of said transformer to said grids in push-pull relation, a source of alternating potential of the same frequency as said signals, a channel for impressing said potential upon said grids in push-push relation in series with said push-pull signal, an electromagnet having a pair of parallel wound and differentially connected windings, and means for connecting respective windings in series with the respective anodes of said tubes.

6. A computer as in claim 5 in which the channel between said alternating potential source and said grids includes a phase shifting network.

7. A computer for generating a signal which is proportional to the product of the functions of two variables plus the product of the functions of two different variables plus the function of a third variable including in combination a source of potential, a first means for proportioning a potential as a function of a first variable, a second means for proportioning a potential as a function of a second variable, a third means for proportioning a function agreeable to a third variable, means for connecting said first and second potential proportioning means in cascade, means for impressing the potential of said source across the input of one of said first two proportioning means, means for connecting said third proportioning means in series with said cascade-connected proportioning means, a fourth means for proportioning a potential as a function of a fourth variable, a fifth means for proportioning a potential as a function of a fifth variable, means for connecting said fourth and fifth proportioning means in cascade, means for impressing said potential source across one of said cascade-connected proportioning means and means for connecting the output of said fourth and fifth cascade-connected proportioning means, said first and second cascade-connected proportioning means and said third proportioning means in series.

8. A computer for generating a signal which is proportional to the product of the function of two variables and the function of a third variable including in combination a source of alternating potential, a first means for proportioning said potential as a function of one of said variables, a second means for proportioning said potential as a function of the second of said variables, a third means for proportioning said potential agreeable to the function of the third variable, means for connecting said first and second potential proportioning means in cascade, means for impressing the potential of said alternating current source across the input of one of said first two proportioning means, means for connecting said third proportioning means in series with said cascade-connected proportioning means to produce a control signal proportional to the product of the functions of said first two variables plus the function of said third variable, a pair of electron discharge devices each having an anode and a grid, means for impressing the control signal upon the grids in push-pull relation, a channel for impressing said alternating potential upon said grids in push-push relation and a phase-shifting network interposed in said channel.

9. A computer for generating a signal proportional to the product of the functions of a first pair of variables plus the function of a third variable, plus the product of the functions of a fourth and fifth variable including in combination a source of alternating potential, a first means for proportioning said potential as a function of the first variable, a second means for proportioning said potential as a function of the second variable, a third means for proportioning said potential agreeable to the function of the third variable, means for connecting said first and second potential proportioning means in cascade, means for impressing said alternating potential across the input of one of said first two proportioning means, means for connecting said third proportioning means in series with said cascade-connected proportioning means, a fourth means for proportioning a potential agreeable to a function of the fourth variable, a fifth means for proportioning a potential agreeable to a function of the fifth variable, means for connecting said fourth and fifth voltage proportioning means in cascade, means for impressing said alternating potential source across one of said cascade-connected means and means for connecting said fourth and fifth cascade-connected proportioning means in series with the first and second cascade-connected proportioning means and said third voltage proportioning means to produce a control signal, a pair of electron discharge devices each having an anode and a grid, means for impressing the control signal upon said grids in push-pull relation, a channel for impressing said alternating potential upon said grids in push-push relation and a phase-shifting network interposed in said channel.

JAMES E. TAYLOR.

REFERENCES CITED

The following references are of record in the file of this patent:

UNITED STATES PATENTS

| Number | Name | Date |
|---|---|---|
| 1,540,797 | Murphy | June 9, 1927 |
| 1,636,031 | Wright | July 19, 1927 |
| 1,808,220 | Hansell | June 2, 1931 |
| 2,118,770 | Silversten | May 24, 1938 |
| 2,164,728 | Wey | July 4, 1939 |
| 2,336,492 | Mackay | Dec. 14, 1943 |
| 2,345,933 | Green | Apr. 4, 1944 |
| 2,382,994 | Holden | Aug. 21, 1945 |
| 2,386,677 | Glass | Oct. 9, 1945 |
| 2,407,140 | Cooke | Sept. 3, 1946 |
| 2,418,238 | Smith | Apr. 1, 1947 |
| 2,455,646 | Beard | Dec. 7, 1948 |
| 2,475,314 | Dehmel | July 5, 1949 |
| 2,478,203 | McCoy | Aug. 9, 1949 |

FOREIGN PATENTS

| Number | Country | Date |
|---|---|---|
| 505,500 | Great Britain | May 11, 1939 |
| 579,325 | Great Britain | July 31, 1946 |